United States Patent
Vu et al.

(10) Patent No.: US 7,933,621 B1
(45) Date of Patent: Apr. 26, 2011

(54) SYSTEMS AND METHODS FOR MERGING ACTIVE TALK GROUPS

(75) Inventors: Trinh D. Vu, Ashburn, VA (US); Arthur Agin, N. Bethesda, MD (US)

(73) Assignee: Nextel Communications Inc., Reston, VA (US)

( * ) Notice: Subject to any disclaimer, the term of this patent is extended or adjusted under 35 U.S.C. 154(b) by 1358 days.

(21) Appl. No.: 11/294,396

(22) Filed: Dec. 6, 2005

(51) Int. Cl.
*H04B 7/00* (2006.01)
(52) U.S. Cl. ........................................ 455/518; 455/519
(58) Field of Classification Search ........... 455/518–521
See application file for complete search history.

(56) References Cited

U.S. PATENT DOCUMENTS

| | | | |
|---|---|---|---|
| 5,423,061 A * | 6/1995 | Fumarolo et al. | 455/519 |
| 6,272,334 B1 * | 8/2001 | Rao | 455/418 |
| 6,865,398 B2 * | 3/2005 | Mangal et al. | 455/552.1 |
| 6,895,254 B2 * | 5/2005 | Dorenbosch | 455/518 |
| 7,209,763 B2 * | 4/2007 | Martin et al. | 455/519 |
| 7,693,533 B2 * | 4/2010 | Sung et al. | 455/518 |
| 2004/0203907 A1 * | 10/2004 | Hiller et al. | 455/456.1 |
| 2005/0032539 A1 * | 2/2005 | Noel et al. | 455/518 |
| 2006/0056635 A1 * | 3/2006 | Pappas et al. | 380/270 |
| 2006/0148493 A1 * | 7/2006 | Narasimha et al. | 455/458 |

* cited by examiner

*Primary Examiner* — Raymond S Dean

(57) ABSTRACT

Methods and systems for merging active dispatch talk groups, which are supported on different call handlers, are provided. The merged talk group can be supported by a single dispatch call handler, or the different dispatch call handlers can support the merged talk group in a master/slave relationship. An identification of the merged talk group is stored for a predetermined amount of time, thereby allowing the merged talk group to be reactivated.

18 Claims, 6 Drawing Sheets

SYSTEMS AND METHODS FOR MERGING ACTIVE TALK GROUPS

BACKGROUND OF THE INVENTION

The mobility afforded by wireless communication networks has resulted in increased usage of such networks. Wireless networks can be divided into private wireless networks and publicly-accessible wireless networks. Private wireless networks, also known as private trunking radio networks, are commonly operated by public safety agencies, taxi services and delivery services. A majority of private wireless networks provide only dispatch communication services, whereas a majority of publicly-accessible wireless networks provide only interconnect communication services. Dispatch communication services are sometimes referred to as "walkie-talkie" communication services because of the half-duplex nature of the communications. Interconnect communication services are what is typically referred to as circuit-switched voice communications.

Private wireless networks typically operate over a limited range of frequencies and within limited geographic areas. Additionally, private wireless networks typically operate using proprietary protocols, have limited expansion capabilities, are expensive to operate and cannot easily interoperate with other private or publicly-accessible wireless networks. In contrast, publicly-accessible wireless networks typically operate over a larger number of frequencies and provide coverage over larger geographic areas. Moreover, publicly-accessible wireless networks use standard protocols, are easier to expand, and interoperate with other publicly-accessible wireless networks.

Private wireless networks are typically preferred by public safety agencies because of the reliability of these networks in emergency situations compared to publicly-accessible wireless networks, which can block calls during emergency situations. Public safety agencies are attracted to publicly-accessible wireless networks as a way to reduce the costs associated with operating and maintaining a private wireless network.

Due to the relative complexity of publicly-accessible wireless networks compared to private wireless networks, some of the features and functionalities provided in private wireless networks are not offered in publicly-accessible wireless networks. Specifically, private wireless networks typically have a single, centrally-located, communications processor (or call handler) for managing and routing communications between wireless stations. In contrast, publicly-accessible wireless networks have a distributed architecture, which involves routing communications between a number of communication processors.

SUMMARY OF THE INVENTION

Methods and systems for merging active dispatch talk groups are provided. Two active dispatch talk groups, which are supported by different dispatch call handlers, are merged into a single talk group. The two talk groups can be merged onto a single dispatch call handler, or the two dispatch call handlers supporting the two active dispatch talk groups can manage the dispatch communications in a master/slave relationship. The two dispatch call handlers can be in the same or different dispatch areas. An identification for the merged dispatch talk group is maintained for a predetermined amount of time after a group call for the merged dispatch talk group has ended, thereby allowing the merged dispatch talk group to be easily reactivated.

Other objects, advantages and novel features of the present invention will become apparent from the following detailed description of the invention when considered in conjunction with the accompanying drawings.

DETAILED DESCRIPTION OF THE PREFERRED EMBODIMENTS

One feature of dispatch communications which is not offered by interconnect communications is talk groups. A talk group is a number of different communication stations which can be joined into a single communication session by dialing a single call identifier. As used herein, the term communication stations includes both wired and wireless communication stations. Talk group communication sessions are highly desired by public safety agencies because of the simplicity of setting up a communication session between, and communicating with, a number of communication stations. However, currently most public safety agencies operate their own private wireless networks, and hence, talk groups cannot be formed between different public safety agencies.

Figure 1A:
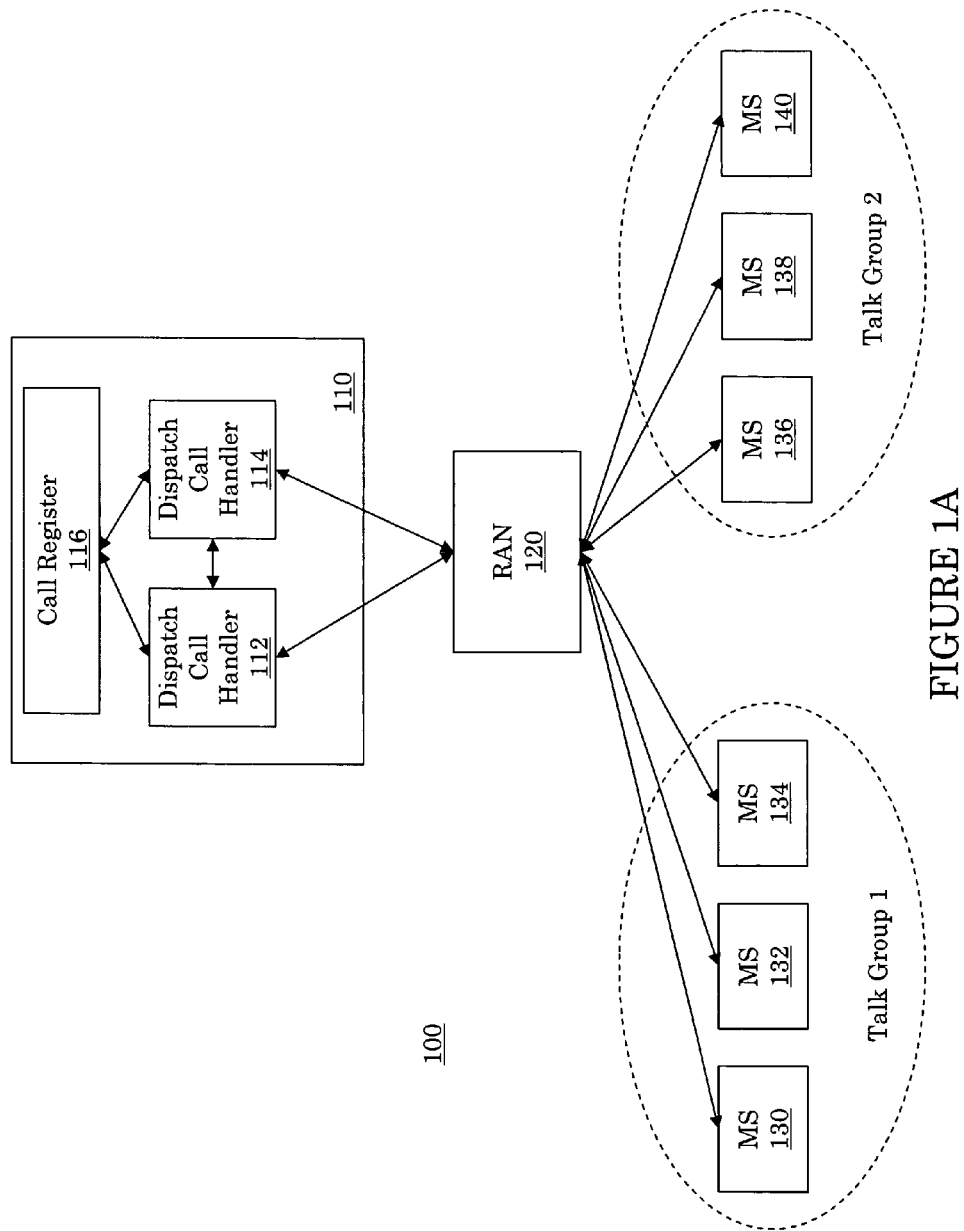
FIGS. 1A and 1B illustrate exemplary publicly-accessible communication networks in accordance with the present invention.

FIG. 1A illustrates an exemplary publicly-accessible communication network 100, which supports talk group dispatch communications in accordance with one embodiment of the present invention. The network 100 includes a dispatch area network subsystem 110, a radio access network (RAN) 120, and a number of mobile stations 130-140. A dispatch area is a geographic area which includes two or more cells that share network subsystems, such as mobile switching centers (MSCs) and location registers. The dispatch area network subsystem 110 includes first and second dispatch call handlers 112 and 114, and a call register 116. The call register 116 generally operates in a similar manner to a location register and performs the functions of a home location register (HLR) to register and authenticate the user. Each dispatch call handler generally operates in a similar manner to a mobile switching center/visitor location register (MSC/VLC) or dispatch application processor (DAP).

Assume that mobile stations 130, 132 and 134 are members of an active talk group (Talk Group 1) and are supported by a first dispatch call handler 112, and that mobile stations 136, 138 and 140 are members of a second active talk group (Talk Group 2) and are supported by a second dispatch call handler 114. As used herein, the phrase active talk groups refers to talk groups which have an ongoing talk group communication session. The present invention allows these active talk groups to be merged into a single talk group. The talk groups can be merged onto either the first or second dispatch call handler such that the merged group call is supported by a single dispatch call handler, without the group communication session passing through the other call handler. Alternatively, the talk groups can continue to be supported on their existing dispatch call handler, with one of the dispatch call handlers acting as a master, and the other dispatch call handler acting as a slave, of the merged talk group.

Figure 1B:
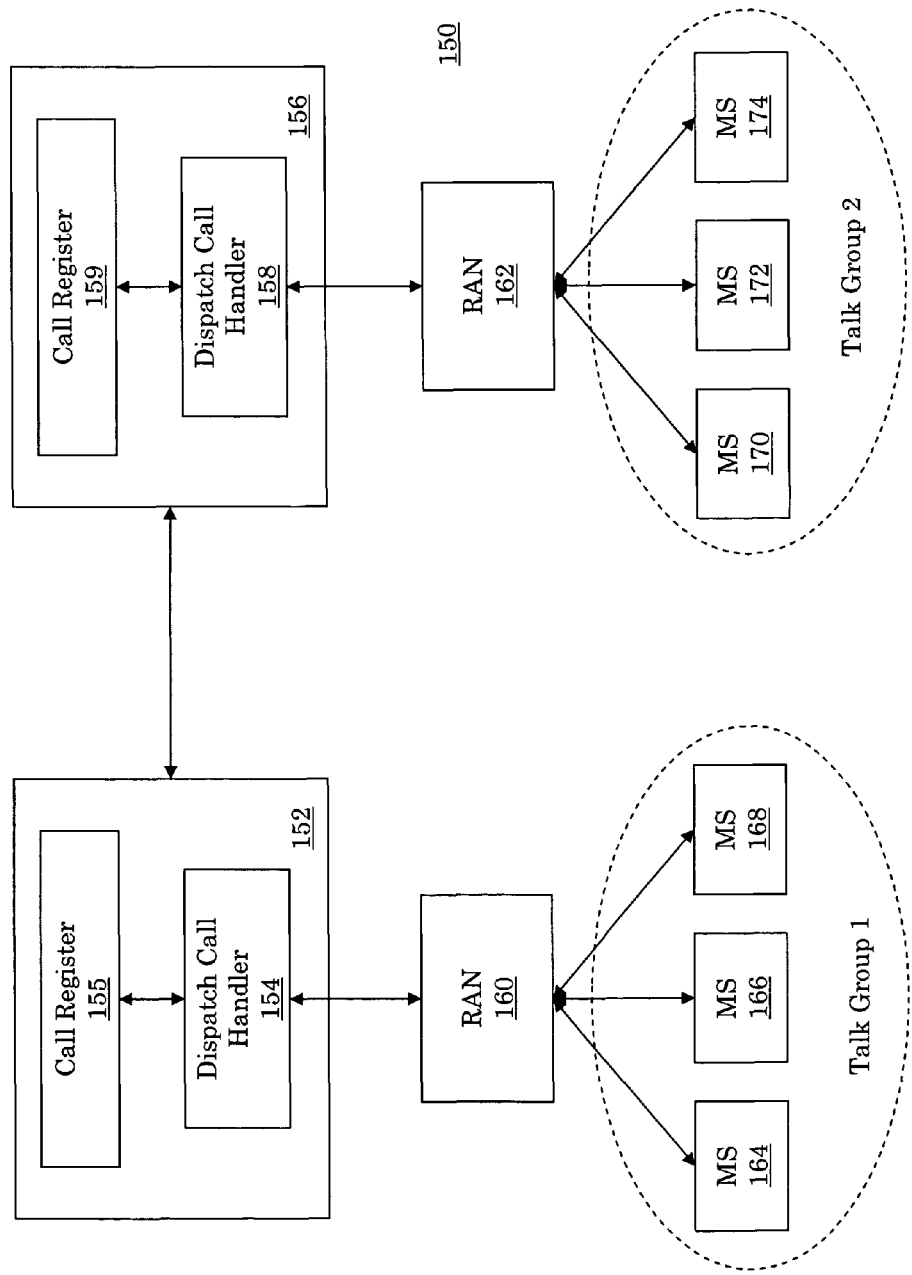

FIG. 1B illustrates an exemplary publicly-accessible communication network 150 which supports talk group dispatch communications in accordance with another embodiment of the present invention. Whereas the publicly-accessible communication network 100 illustrated in FIG. 1A can merge active talk groups within a single dispatch area, the publicly-accessible communication network 150 in FIG. 1B can merge active talk groups between different dispatch areas, each corresponding to a different radio access network. The publicly-accessible communication network 150 includes first and second dispatch area network subsystems 152 and 156 respectively including a first and second dispatch call handler 154 and 158, and first and second call registers 155 and 159. A first talk group (Talk Group 1) comprises mobile stations 164, 166 and 168, which communicate with the dispatch call handler 154 via RAN 160. A second talk group (Talk Group 2) communicates with the dispatch call handler 158 via RAN 162.

Although FIG. 1A illustrates two dispatch call handlers in a single dispatch area network subsystem and FIG. 1B illustrates two dispatch call handlers in different dispatch area network subsystems, the manner in which the active talk groups are merged is similar. The difference between the manner in which the active talk groups are merged will differ only in the types of messaging between the dispatch call handlers. Specifically, dispatch call handlers in the same dispatch area network subsystem may communicate using one type of protocol, while dispatch call handlers located in different dispatch area network subsystems may communicate using a different set of protocols. However, the actual types of messages exchanged between the dispatch call handlers can vary while still being within the scope of the present invention.

Although FIGS. 1A and 1B illustrate all members of the same talk group being supported by the same dispatch call handler, different members of the same talk group can be supported by different dispatch call handlers. Additionally, the networks illustrated in FIGS. 1A and 1B are complementary and not alternatives. For example, the merging of active talk groups provided by the present invention can involve communication stations which are supported by different dispatch call handlers in the same dispatch area network subsystem and communication stations which are supported by another dispatch call handler in another dispatch area network subsystem.

Figure 2:
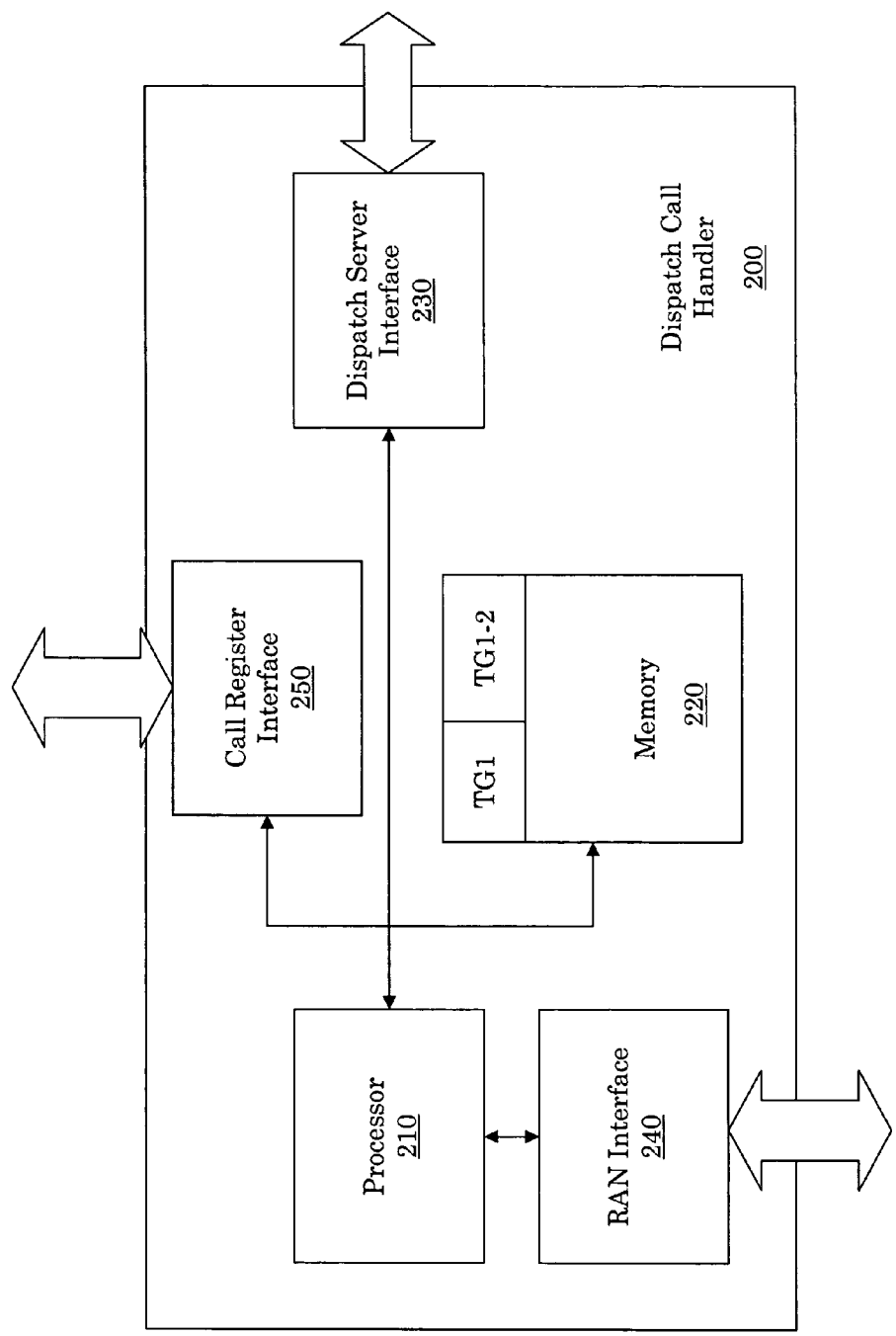
FIG. 2 illustrates an exemplary dispatch call handler in accordance with the present invention.

FIG. 2 illustrates an exemplary dispatch call handler 200 in accordance with the present invention. The dispatch call handler 200 includes a processor 210, memory 220, dispatch call handler interface 230, radio interface 240, and call register interface 250. The memory 220 stores, among other types of information, the membership of Talk Group 1 (TG1) and the merged talk group (TG1-2). The operation of the dispatch call handler will be described in more detail below in connection with method FIGS. 3 and 4.

Figure 3:
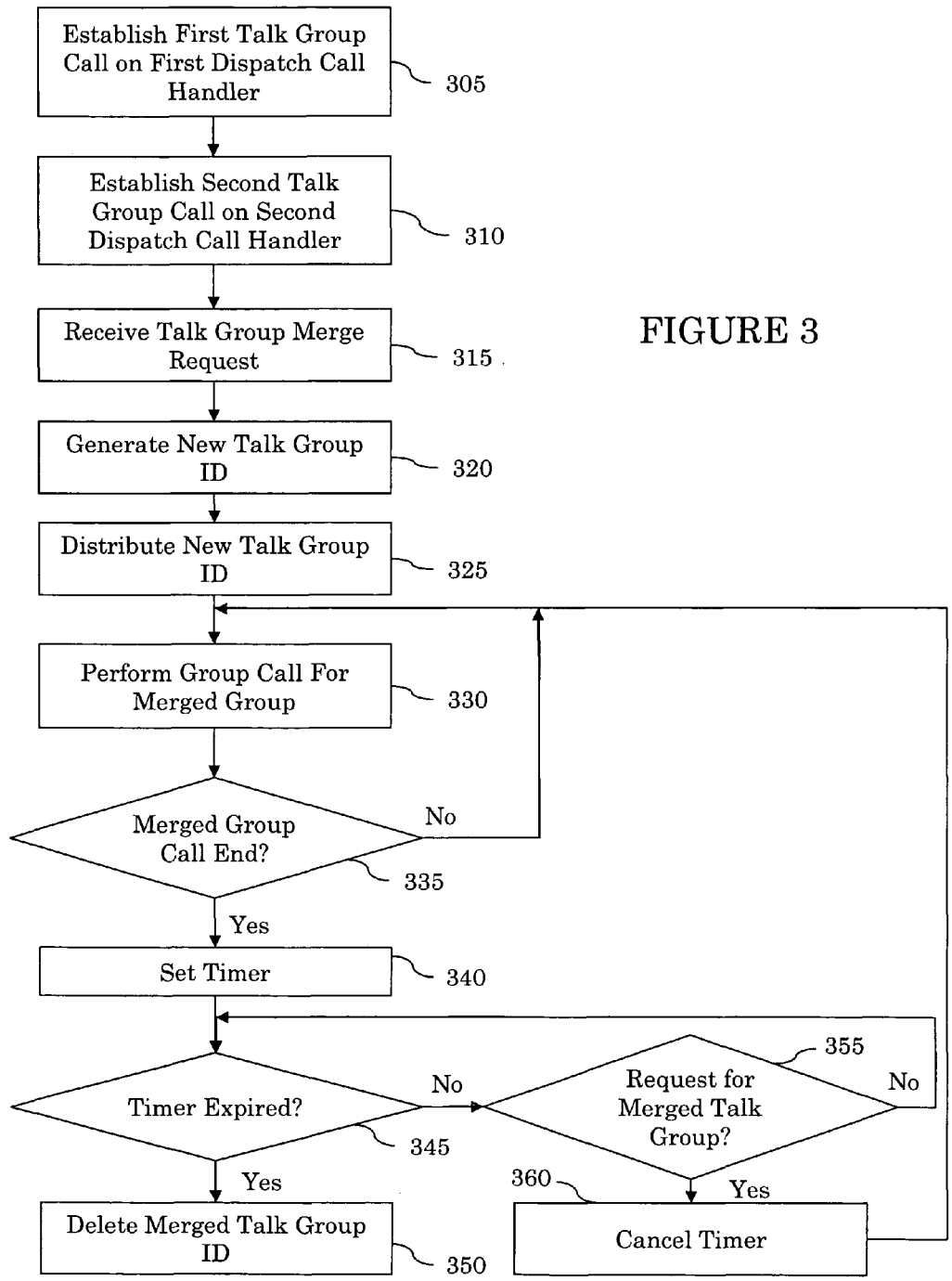
FIG. 3 illustrates an exemplary method for merging active talk groups in accordance with the present invention.

FIG. 3 illustrates an exemplary method for merging active talk groups in accordance with exemplary embodiments of the present invention. The processor 210 of a first dispatch call handler establishes a first talk group in a conventional manner (step 305). The processor 210 of a second dispatch call handler establishes a second talk group in a conventional manner (step 310). One of the dispatch call handlers receives, via the radio interface 240, a request to merge the first and second active talk groups (step 315). The dispatch call handler which received the merge request generates a new talk group ID, which is stored in memory 220 (step 320). The new talk group ID is distributed by the dispatch call handler which receives the merge request to the other dispatch call handler, via the dispatch call handler interface 230, and to the mobile stations for which it is handling communications, via the radio interface 240 (step 325). The group call for the merged talk groups is then performed (step 330). If a mobile station is a member of one of the talk group which are merged, but the mobile station is not participating in the talk group during the merging process, the mobile station receives a page for the missed group call. The mobile station can then join the merged group call by selecting the missed call entry in the call history list.

While the group call for the merged talk group is performed, the processor 210 determines, either continuously or at defined intervals, whether the merged group call has ended (step 335). If the group call is still active ("No" path out of decision step 335), then the group call continues (step 330). However, if the merged talk group call has ended ("Yes" path out of decision step 335), then the processor 210 sets a timer (step 340). While the timer runs the processor 210 determines whether the timer has expired (step 345). If the timer expires ("Yes" path out of decision step 345), then the merged talk group ID is deleted from the memory 220 of both dispatch call handlers (step 350). If, however, the timer has not expired ("No" path out of decision step 345), then it is determined whether there has been a request for a group call for the merged talk group (Step 355).

If there has not been a request for a group call for the merged talk group ("No" path out of decision step 355), then the timer continues to run and it is monitored to determine whether the timer has expired (step 345). If there has been a request for a group call for the merged talk group ("Yes" path out of decision step 355), then the timer is cancelled (step 360) and the group call for the merged talk group is performed (step 335). Specifically, a group call page is transmitted to each of the members of the merged talk group. If two or more members of the merged talk group are located in the same cell, the group call page can be broadcast to those talk group members. Each mobile station which receives the group call page, and is not currently engaged in another communication, will respond to the group call page. The group call is then performed among all members which responded to the group call page.

Distributing the new talk group ID to all members of the merged talk group allows the merged talk group to be restarted by a communication station using the new talk group ID. However, the present invention need not include the ability to restart the merged talk group. In this case, the merged talk group ID need not be distributed to the communication stations of the merged talk groups. Instead, the dispatch call handlers supporting communication stations of the merged talk group can store an association between the merged talk group ID and the IDs of the individual talk groups which have been merged. The dispatch call handlers can then translate the talk group IDs received from the communication stations to the new talk group ID when communicating with other dispatch call handlers.

Figure 4A:
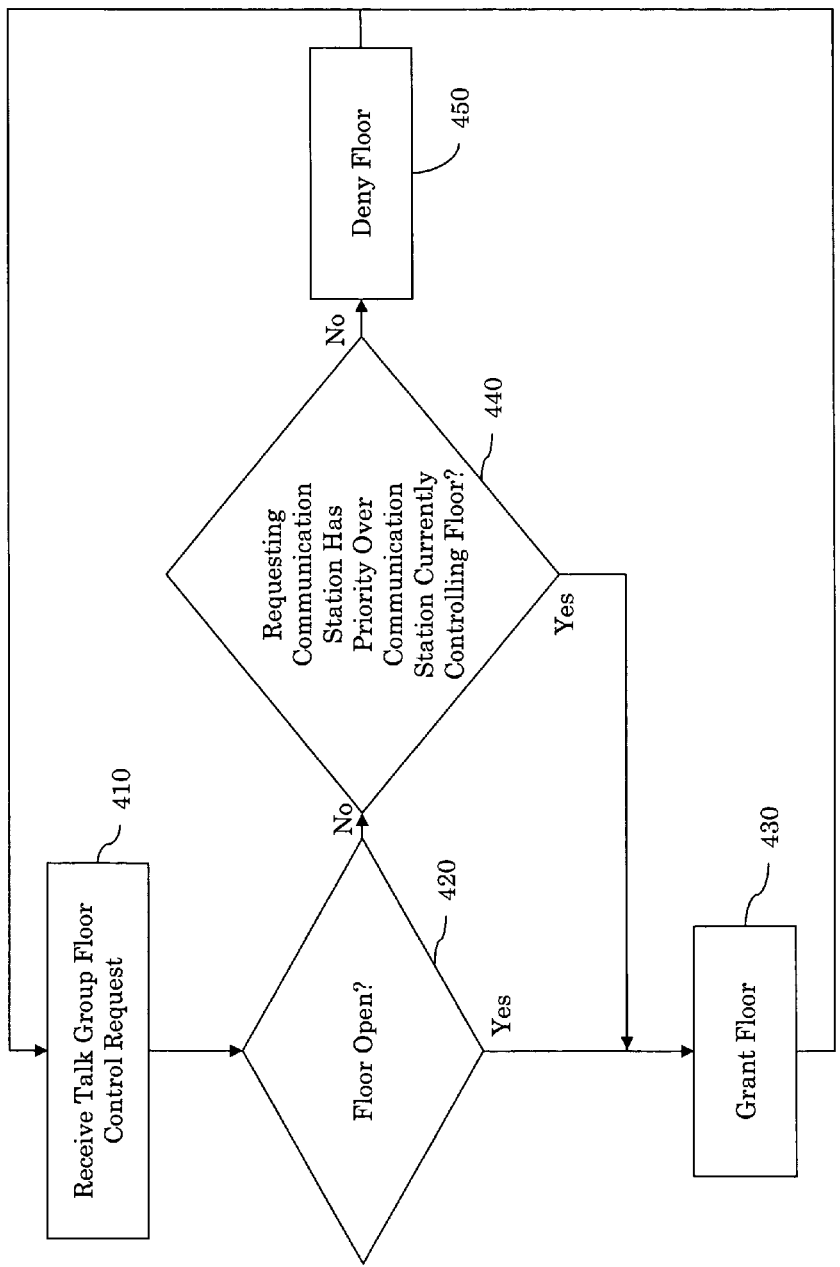
FIGS. 4A and 4B illustrate exemplary methods for arbitrating the floor of a merged talk group in accordance with the present invention.

FIG. 4A illustrates an exemplary method for arbitrating access to the floor of a merged group call supported by a single dispatch call handler in accordance with the present invention. The processor 210 of one of the dispatch call handlers receives a talk group floor control request via its radio interface 240 (step 410). The processor 210 determines whether the floor is currently open (step 420). If the floor is open ("Yes" path out of decision step 420), then the processor 210 grants the floor to the requesting communication station and sets the requesting communication station as the controller of the floor in the memory (step 430).

If the floor is not open when the floor control request is received ("No" path out of decision step 420), then the processor 210 determines whether the requesting communication station has priority over the communication station currently controlling the floor (step 440). If the requesting communication station has priority over the communication station currently controlling the floor ("Yes" path out of decision step 440), then the floor is granted to the requesting communication station and the requesting communication station is marked as the controller of the floor in the memory 220 (step 430). If the requesting communication station does not have priority over the communication station currently controlling the floor ("No" path out of decision step 440), then the requesting communication station is denied access to the floor (step 450).

Figure 4B:
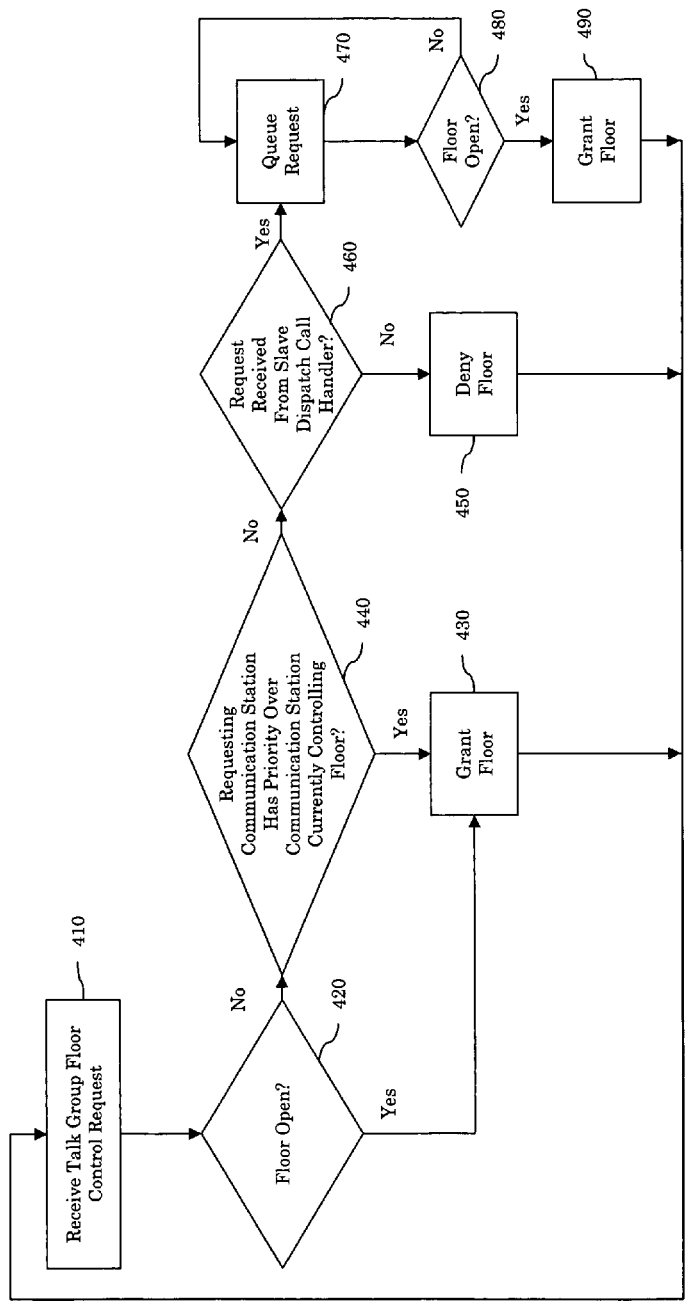

FIG. 4B illustrates an exemplary method for a master dispatch call handler to arbitrate access to the floor of a merged group call supported by a two dispatch call handlers in a master-slave relationship in accordance with the present invention. When the floor is open or when the requesting communication station has priority over the communication station currently controlling the floor, the methods of FIGS. 4A and 4B operate in a similar manner. However, when the floor is not open ("No" path out of decision step 420) and the requesting communication station does not have priority over the communication station currently controlling the floor ("No" path out of decision step 440), then the master dispatch call handler determines whether the floor control request was received from a slave dispatch call handler (step 460). If the floor control request was not received from the slave dispatch call handler ("No" path out of decision step 460), then the floor control request is denied (step 450).

When the floor control request is received from a slave dispatch call handler ("Yes" path out of decision step 460), then the master dispatch call handler queues the request in memory 220 (step 470). Because floor control requests from communication stations supported by a slave dispatch call handler may be delayed compared to requests from communication stations supported directly by the master dispatch call handler, queuing the floor control requests from slave dispatch call controllers reduces "floor starvation" for communications stations supported by slave dispatch call handlers. Accordingly, while the request is queued (step 470), the master dispatch call handler determines whether the floor is open (step 480), and grants the floor to the communication station with the queued floor control request when the floor is open (step 490). The request can be queued for a predetermined time period of a configurable timer. The predetermined time period can be selected to correspond to the delay in messages passing from the slave dispatch call handler to the master dispatch call handler, which delay can be, for example, approximately 5-10 milliseconds. Once the predetermined time period expires, the request is deleted from the queue.

It should be recognized that the present invention has been described as merging two active talk groups for ease of explanation, and not limitation. Accordingly, the present invention is equally applicable to merging more than two active talk groups into a single dispatch talk group.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of facilitating dispatch talk group communications, the method comprising the acts of:
    establishing, by a first dispatch call handler, a first dispatch group call having a first group identification;
    establishing, by a second dispatch call handler, a second dispatch group call having a second group identification;
    generating a third group identification for a single dispatch group call in response to a merge request from a mobile station of the first or second dispatch group;
    distributing the generated third group identification to the first dispatch group and the second dispatch group;
    merging the first and second dispatch group calls into the single dispatch group call,
    wherein the third group identification for the single dispatch group call is different from the group call identification of the first and second dispatch group calls.

2. The method of claim 1, wherein when the single dispatch group call is terminated, the method comprises the acts of:
    setting a timer; and
    deleting the talk group identification associated with the single dispatch group call upon expiration of the timer.

3. The method of claim 2, further comprising the acts of:
    receiving a request for a group call having the talk group identification associated with the single dispatch call group after setting the timer;
    determining whether the timer has expired, and
    upon a determination that the timer has not expired canceling the timer and establishing the single dispatch group call.

4. The method of claim 3, wherein the act of establishing the single dispatch group call comprises the acts of:
    transmitting a group call page to all members of the single dispatch group call;
    receiving responses from at least one of the members of the single dispatch group call; and
    establishing the single dispatch group call between all members for which responses were received.

5. The method of claim 1, wherein the single dispatch group call is supported by the first or second dispatch call handler, and wherein signaling associated with the single dispatch group call is routed to the dispatch call handler supporting the single dispatch group call without passing through the dispatch call handler which does not support the single dispatch group call.

6. The method of claim 1, wherein the first and second dispatch call handlers support the single dispatch group call in a master-servant relationship in which the master call handler arbitrates all talk requests during the single dispatch group call.

7. The method of claim 1, further comprising the acts of:
    receiving a talk request from a member of the single dispatch group call;
    determining whether a floor of the dispatch group call is open; and
    granting the talk request when the floor is open.

8. The method of claim 7, wherein when the floor is not open, the method further comprises the acts of:
    determining whether the member from which the talk group request is received has priority over a member currently controlling the floor; and
    granting the floor to the member from which the talk group request is received if the member has priority over the member currently controlling the floor.

9. The method of claim 1, wherein the first and second dispatch call handlers are accessible via a same radio access network.

10. The method of claim 1, wherein the first and second dispatch call handlers are accessible via different radio access networks.

11. A communication network, comprising:
   a first dispatch call handler, which supports a first dispatch group call;
   a second dispatch call handler, coupled to the first dispatch call handler, which supports a second dispatch group call, wherein the first and second dispatch group calls are merged into a single dispatch group call using a third group identification for the a single dispatch group call in response to a merge request from a mobile station of the first or second dispatch group.

12. The network of claim 11, wherein the single dispatch group call is supported on the first or second dispatch call handler.

13. The network of claim 11, wherein the single dispatch group call is supported by the first and second dispatch call handlers in a master-slave relationship.

14. The network of claim 11, wherein the first and second dispatch call handlers are accessible via a same radio access network.

15. The network of claim 11, wherein the first and second dispatch call handlers are accessible via different radio access networks.

16. A dispatch call handler for a communication network, comprising:
   a processor which establishes a first dispatch group call;
   an interface coupled to the processor, which receives a request to merge a second dispatch group call and the first dispatch group call into a single dispatch group call from a mobile station of the first or second dispatch group and which generates a merged group identifier in response to the received request, wherein the second dispatch group call is supported by another dispatch call handler; and
   a memory coupled to the processor, which stores a talk group identification for the single dispatch group call.

17. The dispatch call handler of claim 16, wherein the memory stores a list of members of the single dispatch group call.

18. The dispatch call handler of claim 16, wherein the processor arbitrates access to a floor of the single dispatch group call.

* * * * *